(12) United States Patent
Underbrink et al.

(10) Patent No.: US 7,929,376 B2
(45) Date of Patent: Apr. 19, 2011

(54) METHOD AND APPARATUS FOR IDENTIFYING NOISE SOURCES

(75) Inventors: James Robert Underbrink, Seattle, WA (US); Leon Brusniak, Lynnwood, WA (US)

(73) Assignee: The Boeing Company, Chicago, IL (US)

( * ) Notice: Subject to any disclaimer, the term of this patent is extended or adjusted under 35 U.S.C. 154(b) by 454 days.

(21) Appl. No.: 12/109,791

(22) Filed: Apr. 25, 2008

(65) Prior Publication Data

US 2009/0268555 A1   Oct. 29, 2009

(51) Int. Cl.
*H04B 1/06* (2006.01)
(52) U.S. Cl. ........................................................ 367/135
(58) Field of Classification Search ................ 367/901, 367/135, 136; 702/190, 191
See application file for complete search history.

(56) References Cited

U.S. PATENT DOCUMENTS

| | | | | |
|---|---|---|---|---|
| 3,985,024 | A * | 10/1976 | Horak | 367/901 |
| 2007/0230270 | A1 * | 10/2007 | Calhoun | 367/117 |
| 2009/0268555 | A1 * | 10/2009 | Underbrink et al. | 367/135 |
| 2009/0326870 | A1 * | 12/2009 | Brusniak | 702/191 |
| 2010/0114534 | A1 * | 5/2010 | Gratzer et al. | 702/190 |

OTHER PUBLICATIONS

Lu, "An Empirical Model for Prediction of Coaxial Jet Noise in Ambient Flow", AIAA 10th Aeroacoustics Conference, Jul. 1986, Seattle, Washington, pp. 1-9.

* cited by examiner

*Primary Examiner* — Dan Pihulic
(74) *Attorney, Agent, or Firm* — Yee & Associates, P.C.; Charles S. Gumpel

(57) ABSTRACT

A computer implemented method and apparatus for identifying component breakdown of noise sources. Noise data is received for a noise source from an array of sound sensors. Measurement points of interest, candidate sound source points along an axis, and array aperture angles are identified. Sets of first and second bounding traces are identified from ray traces extending from the candidate noise source points towards the measurement points of interest using the array aperture angles. The bounding ray traces are rotated around the axis to form sets of first and second surfaces. Sets of first and second curves are identified from an intersection of the sets of first and second surfaces with the ground plane. Sound sensors are selected from the array using the curves to form subarrays. The component breakdown of noise generated by the noise source is identified using noise data from sound sensors in the subarrays.

33 Claims, 13 Drawing Sheets

METHOD AND APPARATUS FOR IDENTIFYING NOISE SOURCES

BACKGROUND INFORMATION

1. Field

The present disclosure relates generally to an apparatus for acquiring data and a method for selecting subsets of the acquired data. Still more particularly, the present disclosure relates to an apparatus for acquiring data and a method for selecting data for use in identifying noise sources.

2. Background

The analysis of noise and the sources or causes of noise is often performed to understand the physics behind the noise generation. For example, an analysis may be performed to identify where the noise is coming from. This type of analysis may be performed in the testing of devices. For example, noise data may be collected for an aircraft engine, such as a jet engine. The noise data collected may be analyzed to determine what components within, and exterior to the jet engine contribute to the noise. These different components may also be referred to as a component noise sources.

Different structures or components in a jet engine or in the jet exhaust generated by a jet engine may contribute different noises at different frequencies. For example, different surfaces within ducts and inlets of a jet engine may contribute noise during the operation of the jet engine. For example, the high speed exhaust flow may contribute noise during the operation of the engine.

For example, surfaces may be treated with various compounds or components in an effort to reduce noise. With this type of example, the jet engine may be tested with the different types of surfaces to determine whether a noise contribution from those surfaces is reduced with the different treatments.

Currently, arrays of microphones may be used to collect noise data. This noise data may be processed to produce a "picture" of where the noise is coming from, and to determine the intensity of the radiated noise. In obtaining this data, microphones may be placed at different locations. With current array designs, hundreds or thousands of array locations are needed to cover all the sound propagation paths formed by connecting hundreds of candidate noise source locations to dozens of measurement points of interest.

The currently used methods for obtaining noise using arrays of microphones are limited to the array size or location. Further, the current methodologies may collect noise information with limited numbers of microphones. The microphones are placed down on a location from which noise data is to be collected. This type of collection may result only in noise data being collected for a limited number of emission angles.

Therefore, it would be advantageous to have a method and apparatus that overcomes the problems described above.

SUMMARY

The advantageous embodiments provide a method and apparatus for use in identifying a component breakdown of noise from a noise source. Noise data are received for the noise source from an array of sound sensors on a ground plane. A measurement point of interest is selected. A candidate sound source point along an axis is selected. An array aperture angle is identified. A first bounding ray trace and a second bounding ray trace are identified from a ray trace extending from the candidate sound source point to the measurement point of interest using the array aperture angle. The first bounding ray trace and the second bounding ray trace are rotated around the axis to form a first surface and a second surface. A first curve is identified from an intersection of the first surface with the ground plane. A second curve is identified from an intersection of the second surface with the ground plane. A set of sound sensors are selected from the array of sound sensors using the first curve and the second curve to form a subarray. The contribution to the overall noise generated by the noise source at the candidate sound source point is identified using a portion of the noise data from sound sensors in the subarray.

In another advantageous embodiment, a method receives first noise data from an array of sound sensors, wherein the noise data is for noise detected from a noise source. Second noise data is received from a set of sound sensors, wherein the second noise data for the noise detected is from the noise source. A subset of sound sensors is identified in the array of sound sensors. A first portion of the first noise data associated with the subset of sound sensors and a second portion of the second noise data for a sound sensor located at a measurement point of interest is selected.

In yet another advantageous embodiment, an apparatus comprises an array of sound sensors, a data acquisition system, and a data processing system. A set of sound sensors are located at a set of measurement points of interest. The data acquisition system is coupled to the array of sound sensors and the set of sound sensors, wherein the data acquisition system is capable of receiving first noise data from the array of sound sensors and receiving second noise data from the set of sound sensors; identifying a primary ray trace extending from a candidate sound source point towards a sound sensor; identifying an angle for the primary ray trace relative to the axis; identifying a first bounding ray trace and a second bounding ray trace from a ray trace extending from the candidate source point to the measurement point of interest, wherein the first bounding ray trace has a first angle greater than the angle and the second ray trace has a second angle less than the angle; identifying a first curve from an intersection of a first surface, created from a rotation of the first bounding ray trace around the axis, with a ground plane; identifying a second curve from an intersection of a second surface, created from a rotation of the second bounding ray trace around the axis, with the ground plane; and selecting the set of sound sensors from the array of sound sensors using the first curve and the second curve to identify the subset of sound sensors.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
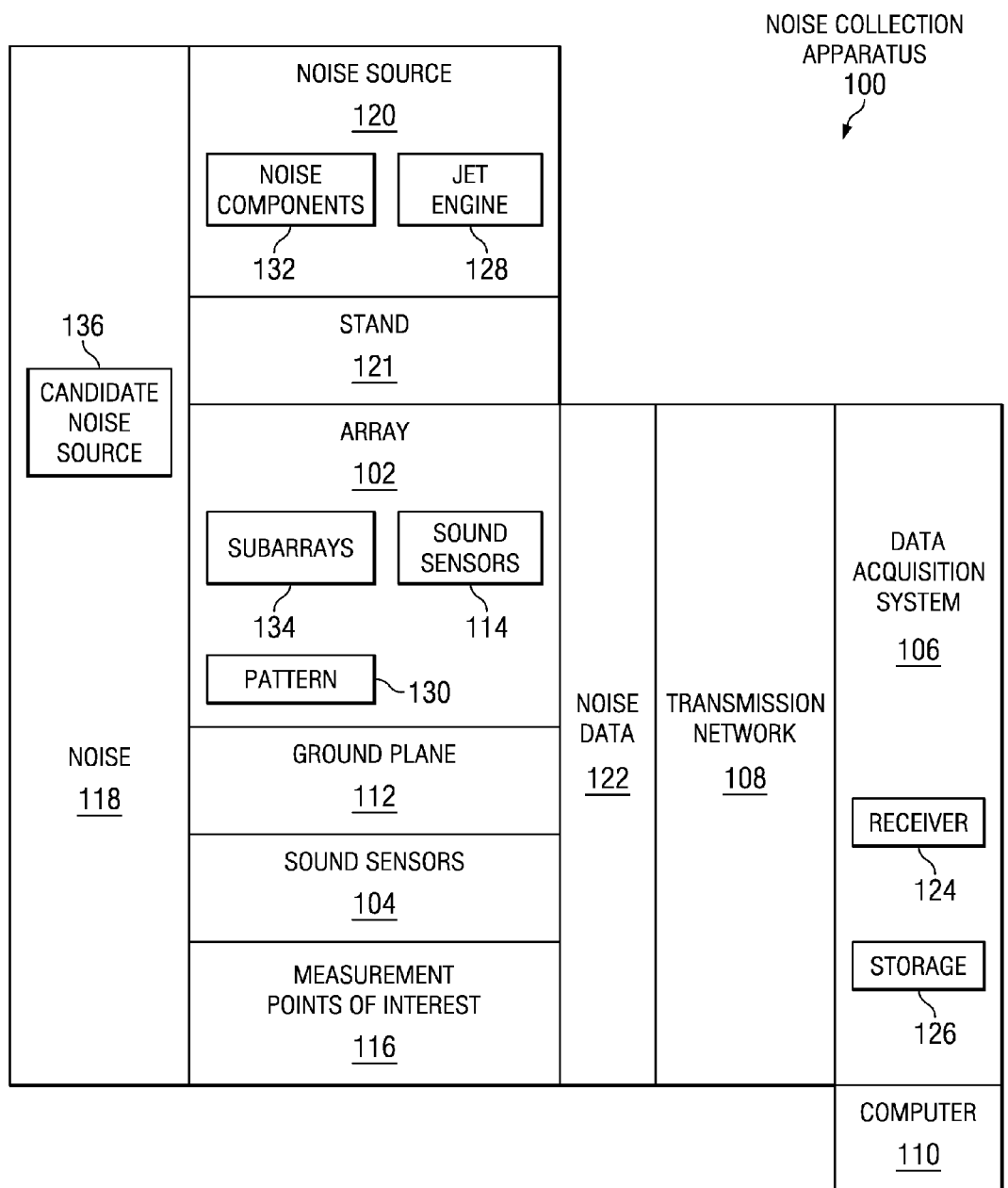
FIG. 1 is a diagram illustrating a noise collection apparatus in which an advantageous embodiment may be implemented.

With reference now to the figures and in particular with reference to FIG. 1, a diagram illustrating a noise collection apparatus is depicted in accordance with an advantageous embodiment. In these examples, noise collection apparatus 100 comprises array 102, sound sensors 104, data acquisition system 106, transmission network 108, and computer 110.

In these examples, array 102 is located on ground plane 112. In these examples, ground plane 112 may be the ground on which array 102 is placed. In some cases, ground plane 112 may not be a plane in a mathematical sense, because the ground in which array 102 is placed may not be entirely flat. Array 102 is made up of sound sensors 114 in these examples. Additional sound sensors in sound sensors 104 may be located at measurement points of interest 116. These sound sensors may take various forms. For example, without limitation, sound sensors 104 and 114 may be microphones, hydrophones, laser sensors, seismometers, and other suitable sensors.

In these illustrative examples, array 102 and sound sensors 104 may detect noise 118, which may be generated by noise source 120. In these examples, noise source 120 is mounted on stand 121, which may be above ground plane 112. In these examples, noise source 120 may take various forms. For example, noise source 120 may be jet engine 128. Of course, noise source 120 may take various forms.

Other examples of noise sources include, for example, without limitation, a train, a submarine, a water vehicle, a car, a bus, a stretch of highway (with traffic), a production facility, a building, or some other structure or device that may generate noise. Further, noise source 120 also may be an organic or living noise source. For example, noise source 120 also may be, for example, without limitation, a crowd of people, a herd of cattle, or some other suitable noise source.

Depending on the particular selection for noise source 120, stand 121 may not be needed. For example, if noise source 120 is a stretch of highway, stand 121 is unnecessary. Instead, array 102 and sound sensors 104 may be arranged at a distance from a highway appropriate to detect and analyze noise 118 from noise source 120.

Noise 118, detected by sound sensors 114 in array 102, and sound sensors 104, causes the generation of noise data 122. In turn, noise data 122 may be sent to data acquisition system 106 through transmission network 108. Noise data 122 may be received by receiver 124 within data acquisition system 106 and stored within storage 126. In these examples, storage 126 is a storage device used to store data in a format usable by a data processing system. Storage 126 may be, for example, a hard disk drive, a floppy disk, a tape drive, or some other suitable storage device. Noise data 122 may then be transmitted from storage 126 to computer 110 for analysis.

Sound sensors 114 in array 102 and sound sensors 104 detect noise 118 and create noise data 122. This noise data is sent to data acquisition system 106 over transmission network 108. Transmission network 108 may take various forms. For example, transmission network 108 may be a set of wires connecting sound sensors 114 and 104 to data acquisition system 106.

In other advantageous embodiments, transmission network 108 may be fiber optic cables and/or wireless transmission links. Of course, a mixture of different types of transmission media also may be used for transmission network 108, depending on the particular implementation. Noise data 122 is received by receiver 124 and stored within storage 126. This noise data contains the potential to create "pictures" of noise 118 over different periods of time.

In these different advantageous embodiments, array 102 and sound sensors 104 are arranged such that these sensors are capable of detecting noise 118 generated by noise source 120 to collect noise data 122.

In these examples, array 102 is sound sensors 114, which is arranged in pattern 130. Sound sensors 114 may be a heterogeneous or homogeneous set of microphones. The types of microphones selected may differ depending on the particular test. In designing array 102, a number of constraints may be considered.

These constraints include, for example, without limitation, the location of array 102 and its proximity to noise source 120, the technique for mounting sensors for array 102, the channel count availability for array 102, the data acquisition time constraints for array 102, the configuration of the testing facility, and other suitable constraints.

Further, in designing array 102, a number of requirements may be taken into account. These requirements may include, for example, without limitation, a frequency range over which array 102 is useful, source emission angle range over which array 102 is applicable, candidate noise source location region to be interrogated by array 102, spatial resolution of sources, simultaneous data acquisition, and other suitable design requirements.

In these examples, the frequency range over which array 102 is useful may be, for example, the frequency range over which array 102 is capable of providing sufficient measurement fidelity to assess or identify noise components 132 from noise source 120. Noise source 120 may have one or more components that contribute to or are sources for noise 118. The resolution of sources may be the ability to resolve two sources within a given distance of each other. Further, in these examples, it is required to acquire data from all sound sensors 104 and 114 simultaneously.

All sound sensors in sound sensors 114 in array 102 may be placed at least a selected distance away from a candidate noise source region for a noise source 120. A candidate noise source region in these examples is the region that encompasses all the candidate noise source points.

Array 102 may be subdivided into subarrays 134 in these examples. In these different illustrative embodiments, it is desirable to be able to select any particular subarray within subarrays 134. In these advantageous embodiments, a subarray within subarrays 134 may be selected to provide noise data 122 for noise propagating along a noise path, from candidate noise source point 136 in the candidate noise source region in the proximity of noise source 120 to a sound sensor in sound sensors 104 at a measurement point of interest within measurement points of interest 116.

This noise data, along with noise data from the selected sound sensor at the point of interest, may be used to better analyze noise source 120 and to identify noise components 132 due to noise source 120. Computer 110 may select subarrays 134 and obtain the noise data associated with subarrays 134 within noise data 122 for analysis.

Figure 2:
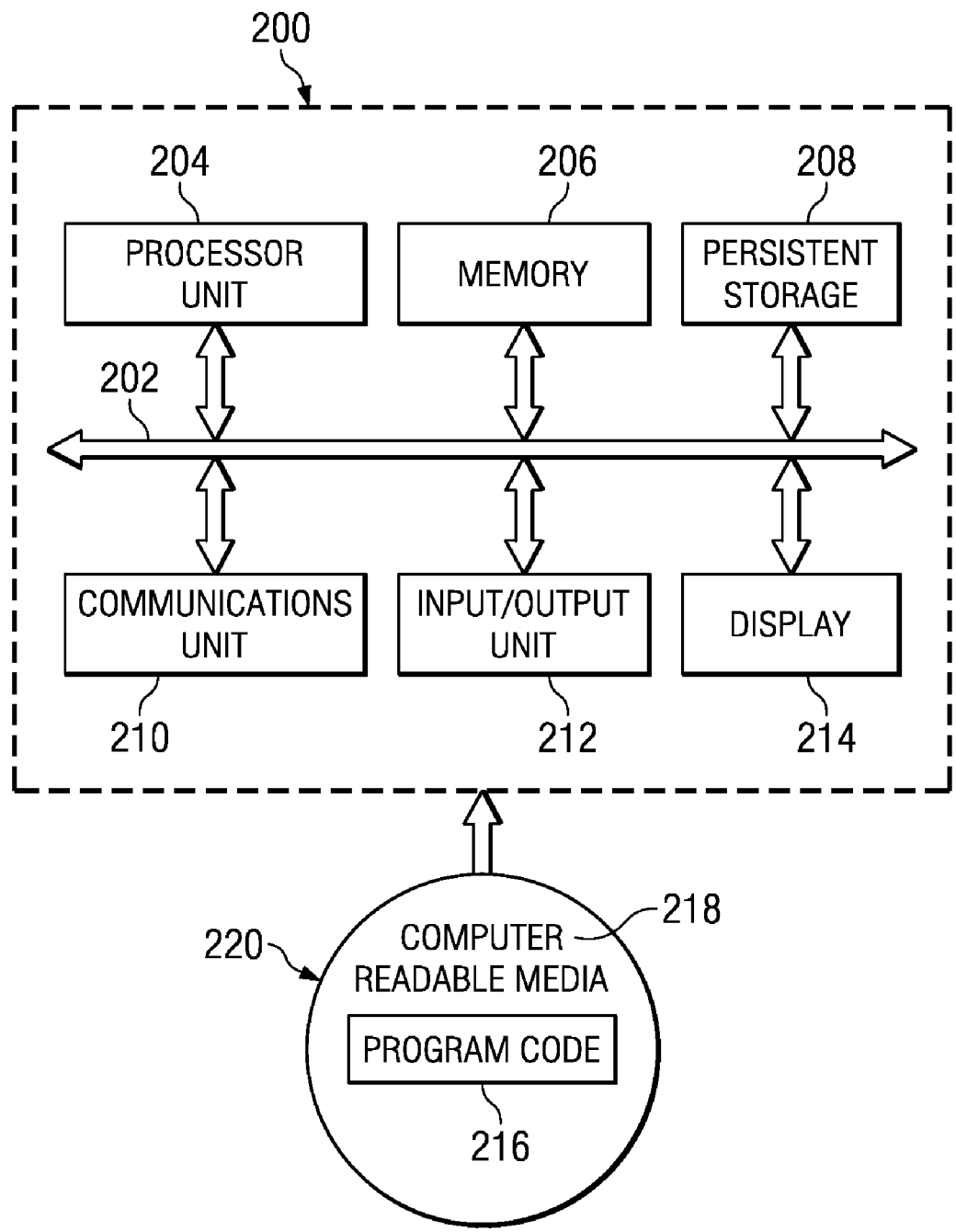
FIG. 2 is a diagram of a data processing system in accordance with an advantageous embodiment.

Turning now to FIG. 2, a diagram of a data processing system is depicted in accordance with an advantageous embodiment. In this illustrative example, data processing system 200 includes communications fabric 202, which provides communications between processor unit 204, memory 206, persistent storage 208, communications unit 210, input/output (I/O) unit 212, and display 214.

Data processing system 200 is an example of a data processing system that may be used to implement data acquisition system 106 and/or computer 110 in FIG. 1. If used to implement data acquisition system 106 in FIG. 1, input/output unit 212 may be connected to transmission network 108 in FIG. 1. With this type of implementation, storage 126 in FIG. 1 may be implemented as persistent storage 208 and/or memory 206 in these examples.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation.

For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208.

In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208 and computer readable media 218 are examples of storage devices in a tangible form.

Figure 3:
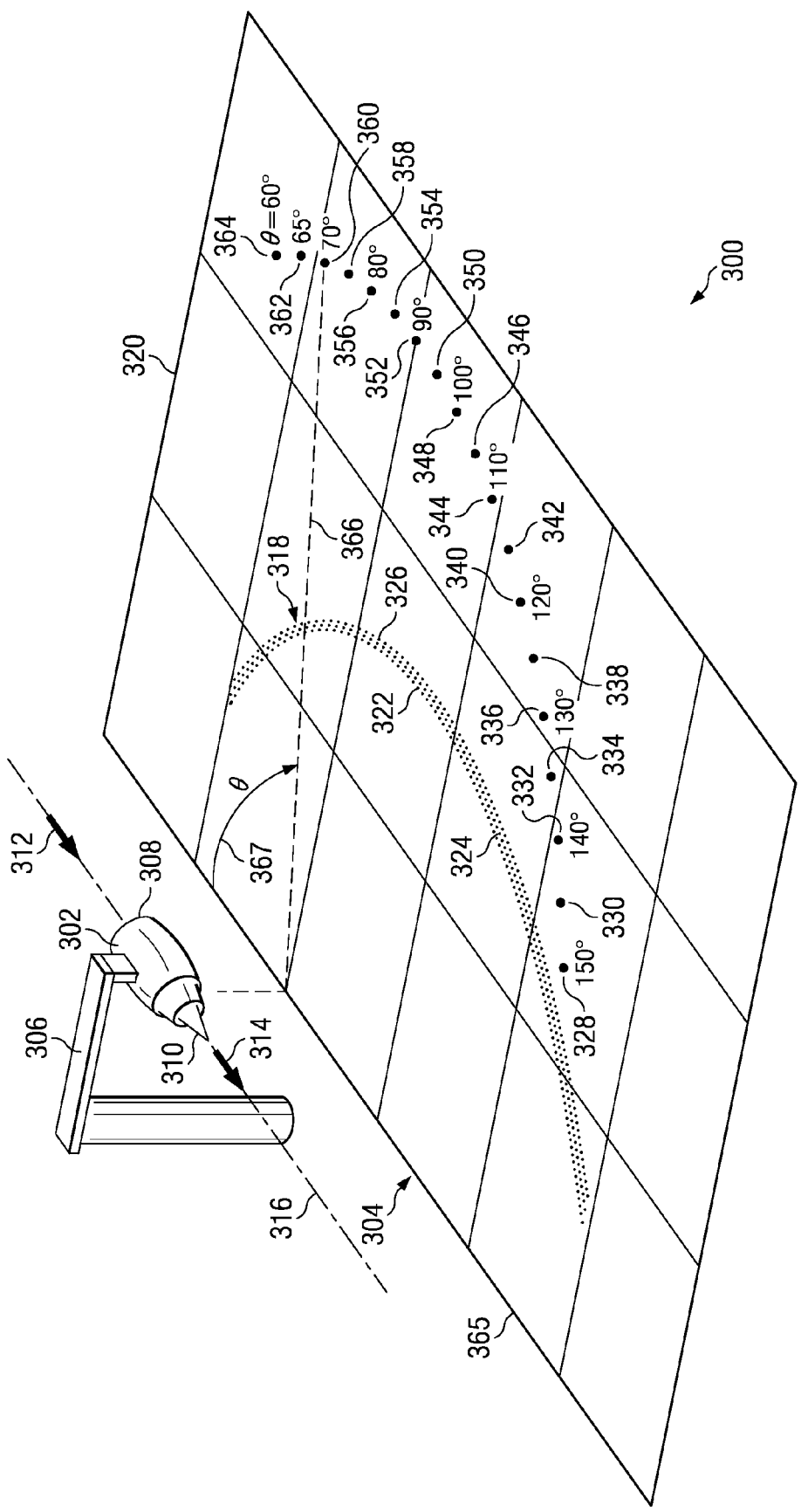
FIG. 3 is an illustration of a noise collection apparatus in accordance with an advantageous embodiment.

With reference now to FIG. 3, an illustration of a noise collection apparatus is depicted in accordance with an advantageous embodiment. In this example, noise collection apparatus 300 is an example of one implementation of noise collection apparatus 100 in FIG. 1 except that transmission network 108, data acquisition system 106, and computer 110 have been excluded from the illustration. In this example, jet engine 302 is mounted above ground 304 on stand 306. Jet engine 302 is a device under test and is an example of a noise source, such as noise source 120 in FIG. 1, that may be analyzed using noise collection apparatus 300. Stand 306 is an example of one implementation of stand 121 in FIG. 1.

Jet engine 302 has inlet 308 and exhaust nozzle 310. Inlet 308 receives air flow into jet engine 302 as illustrated by arrow 312. Exhaust flow leaves jet engine 302 through exhaust nozzle 310 as shown by arrow 314. Noise generated by jet engine 302 may radiate from various points of jet engine axis 316, as well as from other points that may be selected.

The collection of noise data may be made through noise collection apparatus 300, which includes phased array microphones 318. These microphones are an example implementation of array 102 in FIG. 1. Phased array microphones 318 are arranged in a pattern on ground plane 320 located on ground 304.

Noise collection apparatus 300 also includes far field microphones 328, 330, 332, 334, 336, 338, 340, 342, 344, 346, 348, 350, 352, 354, 356, 358, 360, 362, and 364. These microphones are located at measurement points of interest. In this example, nineteen fixed locations are present. These microphones may be located on and/or above ground plane 320. These microphones may be mounted on structures to locate the microphones above ground plane 320.

In these examples, array 318 is selected or configured to have a relatively consistent density of sensors over all, while having non-redundant sensor-to-sensor spacing locally. Array 318 has approximately or around the same number of elements in different locations of the array to provide a relatively consistent density overall. If array 318 has a relatively consistent density, then extracting a subarray of a given aperture size anywhere along array 318 results in a subarray with approximately the same number of sensors. Non-redundant sensor spacing means that the vector spacing between any two elements in the subarray will be unique. Vector spacing is the distance and direction. A non-redundant array has no two vector spacings that are the same.

In this example, phased array microphones 318 contain 416 elements at fixed locations. The different microphones within phased array microphones 318 may be located at a spacing of around six inches from each other. Further, phased array microphones 318 may span over 200 feet to cover the range of required emission angles at the minimum required distance from jet engine 302.

Array 318 has a pattern in the form of an arc, in these examples. In particular, phased array microphones 318 are arranged in the arc containing three lines, line 322, line 324, and line 326.

The half-wavelength criteria for array design to prevent spatial aliasing (i.e., false images) when using equally spaced sensors limits the usefulness of an equally spaced array to about 1000 Hz when six inch spacing is used. In other words, the spacing between adjacent sound sensors in the array must be less than or equal to the half wavelength criteria for equally spaced sound sensors to avoid false images when performing noise source location operations.

The different advantageous embodiments recognize that currently an array may be designed for frequencies exceeding this half-wavelength criteria by using a design approach that insures non-redundant spacing between microphone pairs. Such an array may eliminate false images and suppress array side lobes to the point where the array is useful over a broad range of frequencies. The advantageous embodiments also recognize that an array can be formed using a strategy, such as geometrically increased spacing between successive microphones.

However, the different advantageous embodiments recognize that these arrays are "point design" arrays. For example, these arrays are designed as a single array for a single position. The different advantageous embodiments recognize that multiple instances of these point design arrays may be deployed to cover multiple emission angles, but this type of deployment will be insufficient to meet the design requirements described above, where the array needs to be able to be centered at effectively hundreds or thousands of locations.

The different advantageous embodiments also recognize that a traversable array also will not solve the problem, again, because the need for a large number of array locations would be prohibitive from a test conduct standpoint, for example, the time to acquire data for the number of traverse positions required may be prohibitive.

Thus, the different advantageous embodiments recognize that what is needed is an array that is globally made up of a relatively consistent density of microphones, but is locally non-redundant. The relatively consistent density across the array enables selection of similarly performing subarrays at any point within the array. The locally non-redundant characteristic enables these subarrays to perform well across a broad range of frequencies, including frequencies that substantially exceed the half-wavelength criteria for equally spaced array elements. The array design, in the different advantageous embodiments, embraces and achieves these principles.

Phased array microphones 318 may distributed as a set of concentric logarithmic spirals. As used in these examples, concentric logarithmic spirals have a common point of origin from which the spirals are formed. These spirals start with different initial radii such that when the spirals are formed, nearly parallel curves are present. A logarithmic or equiangular spiral is a well known mathematical construct.

In one embodiment, phased array microphones 318 include three logarithmic spiral arcs with a common origin and a small increase in initial radius for each successive spiral, thus forming three parallel curves. Parameters may be chosen for the logarithmic spirals to ensure that every point on the curve is at least 10 mixed nozzle diameters from every point in the candidate source region. Mixed nozzle diameter is also referred to as Dmix. Dmix is the effective diameter of the exhaust flow from the jet engine.

In this example, 10 mixed nozzle diameters is considered to be far enough away from the source region that noise source components detected by the phased array microphones 318 can be used to accurately estimate the strength of those sources at distances farther away from the sources than the phased array microphones 318. The logarithmic spiral parameters include, for example, origin location, spiral angle, and initial radius. The logarithmic spirals are sampled to determine sensor locations, each using different base spacings between successive sensors.

In the illustrative examples, the curve with the smallest radius uses a base spacing of 26.8", the curve with the next larger radius uses a base spacing of 22.8", and the curve with the largest radius uses a base spacing of 17.8". Within each log spiral curve, the actual spacing may be varied from the base spacing according to the sequence {−1.5", −1.0", −0.5", 0.0", 0.5", 1.0", 1.5"}, and the sequence is repeated until the entire spiral has been sampled.

The base spacing may be chosen to distribute the available number of sensors over the full length of the three curves. A different base spacing is used for each curve such that when the base spacing with variation is applied to each curve, no spacing is repeated until the variation sequence is recycled for a given curve. This strategy creates a locally non-redundant array while preserving a relatively constant density of sensors along the full length of the array. The spatially separated curves, along with the log spiral arc, contribute to additional non-redundancy both locally and globally.

The array of sensors in phased array microphones 318 also may be more generally a set of concentric curves for which a shape of the set of curves is selected by a minimum distance of the array of sensors to the candidate source region and wherein a nearest curve in the set of curves is located at the minimum distance. As used in these examples, the minimum distance may vary in different implementations.

In these examples with jet engine 302, the minimum spacing is around 10 mixed nozzle diameters. The set of all of the candidate source location points comprises the candidate source region. In other words, a user may define the source region and specify a minimum distance. These parameters may be used to form a boundary around the source region such that no point outside the boundary is less than the minimum distance from any point in the source region.

In the different examples, the microphones in phased array microphones 318 may have a shape of a continuous curve for which a tangent to the continuous curve is kept substantially close to perpendicular to lines of sight to the candidate noise source locations to be assessed using the sensor array. Also, the phased array microphones 318 may be located substantially perpendicular to lines of sight from the potential noise source region of interest to the measurement points of interest.

The above example array design is not intended to restrict the array design parameters that may be implemented in the different advantageous embodiments. The array may be composed from a single curve or multiple curves. Various other strategies could be used within each curve. The one feature, in these different designs, is globally consistent array density, with locally non-redundant sensor spacing. The location of the array relative to the device under test is application dependent, but the array design principles still apply.

Increased density of microphones will typically improve subarray performance since, for a non-redundant array, the number of sensors in an array for a given aperture size generally improves sensor array performance both in terms of array dynamic range and maximum frequency at which the array provides useful information.

Thus, the design strategy provides an approach for making optimal use of a restricted number of sound sensors for broad coverage of emission angles and frequency range.

In the different advantageous embodiments, the different far field microphones 328-364 are arranged in locations with respect to jet engine axis 316. These different locations have different angles. Line 365 is directly below and parallel to jet engine axis 316 on ground plane 320. The angles for far field microphones 328-364 may be determined from line 365 on the ground, as shown by line 366 and angle 367, which is also referred to as $\theta$.

For example, far field microphone 328 is located at 150 degrees relative to jet engine axis 316. Far field microphone 340 is located at 120 degrees relative to jet engine axis 316. As another example, far field microphone 362 is located at 65 degrees.

In the different advantageous embodiments, noise generated by jet engine 302 may be detected by phased array microphones 318 and far field microphones 328-364. These different microphones transduce noise into noise data which may be analyzed to identify different noise source component locations due to operation of jet engine 302. In these examples, the analysis may be made for candidate noise source locations and for different measurement points of interest. In these examples, the candidate noise source locations may lie along jet engine axis 316 and the measurement points of interest may correspond to the locations of the far field microphones 328-364.

A similar setup may be made for other devices or noise sources. For example, for a highway with traffic, a laterally distributed region of potential noise sources is present. For the highway, various characteristics such as, for example, overpasses, intersections, and differing road surfaces, and other suitable features may be present. The measurement points of interest may be locations such as, for example, residences, city parks, businesses, and other suitable locations.

Microphones are present at the measurement points of interest to measure the overall noise at those locations. An array may be deployed between the candidate source region, the highway, and the points of interest to determine component breakdown of sources contributing to the overall noise at the points of interest.

From the noise data, a particular far field microphone may be selected to analyze noise data for a particular measurement point of interest. For example, with reference now to FIG. 4, far field microphone 330 may be selected with candidate noise source location 400. Noise path 402 originates at candidate noise source location 400 and ends at far field microphone 330.

With noise path 402, subarray 468 may be selected from phased array microphones 318 to provide data to analyze the noise propagating along noise path 402. With data from subarray 468 and far field microphone 330, an analysis of contributions from candidate noise source location 400 to the noise detected at far field microphone 330 propagating on noise path 402 due to operation of jet engine 302 may be made.

The different advantageous embodiments provide an ability to select multiple subarrays from phased array microphones 318. These subarrays may be selected after noise data has been collected, rather than requiring a setup for a particular noise path and angle.

Currently, a single emission angle is selected and an array is centered on the selected emission angle. The advantageous embodiments recognize that this technique has a number of limitations. Data can be obtained only from a single emission angle. Also, the sources may be distributed over a significant distance so the radiation angle to the array varies with each source. For example, a source may be present at the nozzle exit and another source may be several feet downstream. These sources, as seen by the "point design" array are propagating to different far field microphones.

As a result, the contributions of all the sources to a given far field location cannot be determined. At best, the contribution of each source may be determined for at most perhaps one far field location for each source. No two different source location contributions to the same far field location may be possible with this technique. The advantageous embodiments enable determination of the contribution of all sources to all far field locations.

Only the sound sensors are depicted in this illustration of noise collection apparatus 300 in FIG. 3. Noise collection apparatus 300 may include other components not shown in this example. These other components are not shown in order to avoid obfuscating the different features of the advantageous embodiments.

The illustration of the far field microphones and the phased array microphones in FIG. 3 are presented for purposes of illustrating one manner in which the microphones may be laid out. Other configurations may be used depending on the particular implementation. For example, phased array microphones 318 may be arranged in a single line or curve of microphones. Further, other shapes may be used, depending on the particular device under test. Other devices under test may result in other configurations.

Further, in other advantageous embodiments, the far field microphones may be located closer to the noise source than phased array microphones 318. In yet other advantageous embodiments, some far field microphones may be located closer to the noise source than phased array microphones 318, while others are located farther way.

Figure 4:
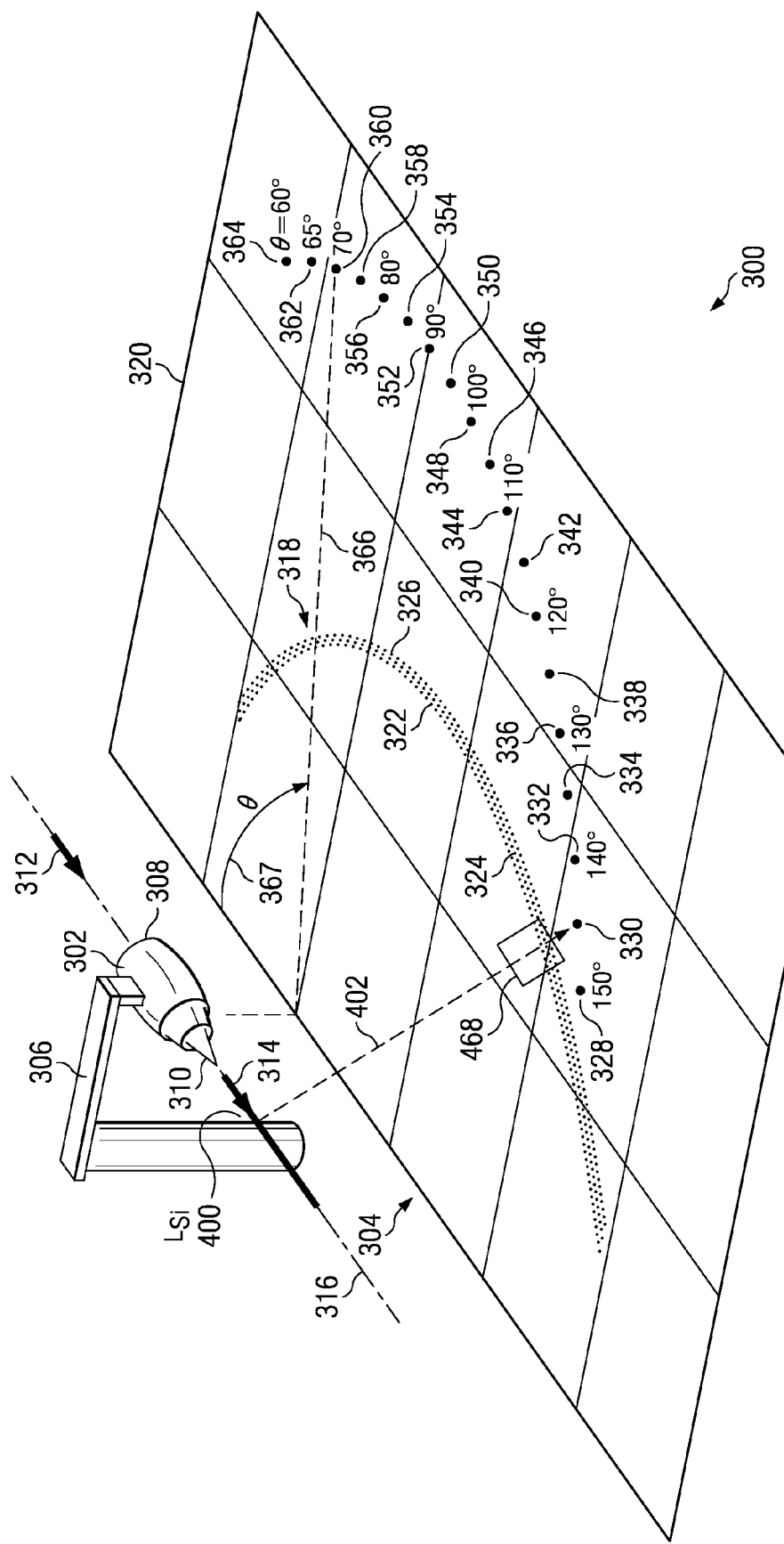
FIG. 4 is a diagram illustrating a first step in a selection of a subarray of microphones in accordance with an advantageous embodiment.

With reference now to FIG. 4, a diagram illustrating a first step in the selection of a subarray of microphones is depicted in accordance with an advantageous embodiment. In this example, candidate noise source location 400 is a point along jet engine axis 316. Candidate noise source location 400 is a potential location of a source of noise from jet engine 302 for which analysis is desired. Candidate noise source location 400 is also referred to as a candidate source location point $L_{Si}$.

In this example, far field microphone 330 is located at a measurement point of interest. Far field microphone 330 forms a measurement point of interest source location point $L_{Fj}$. Candidate noise source location 400 and far field microphone 330 form the points for ray trace 402, which is also referred to as ray trace $R_{Si,Fj}$. In this illustrative example, ray trace 402 defines a path of noise propagation from candidate noise source location 400 to the point of interest at far field microphone 330.

Figure 5:
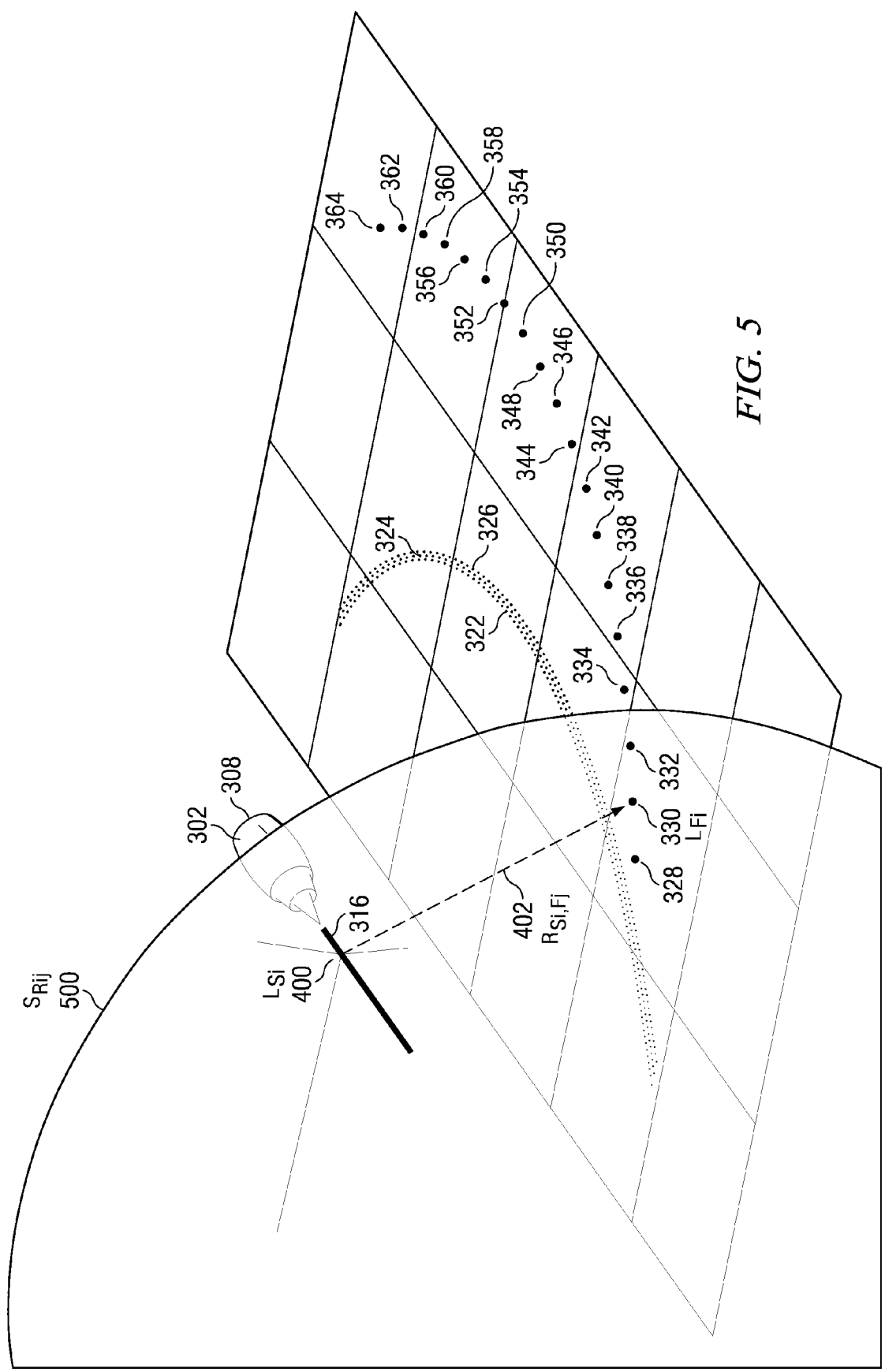
FIG. 5 is an illustration of a surface generated by rotating a ray trace in accordance with an advantageous embodiment.

With reference now to FIG. 5, an illustration of a surface generated by rotating a ray trace is depicted in accordance with an advantageous embodiment. In this example, surface 500 is referred to as surface $S_{Rij}$. Surface 500 is generated by rotating ray trace 402 in FIG. 4 around jet engine axis 316.

Figure 6:
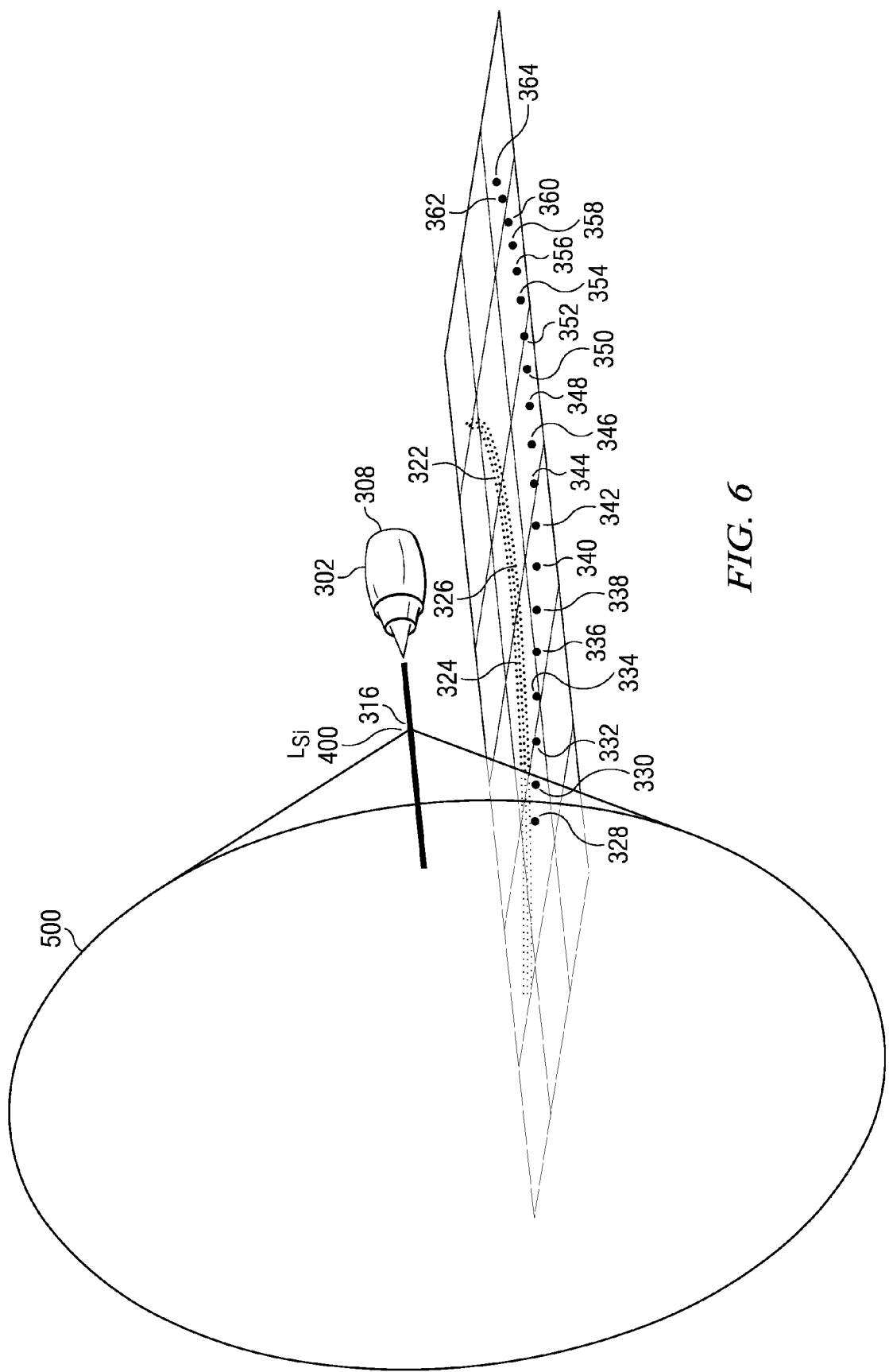
FIG. 6 is another view of a surface formed by rotating a ray trace in accordance with an advantageous embodiment.

With reference now to FIG. 6, another view of a surface formed by rotating a ray trace is depicted in accordance with an advantageous embodiment. In this example, surface 500 may be seen in another perspective. In this view, surface 500 can be seen as a cone.

Figure 7:
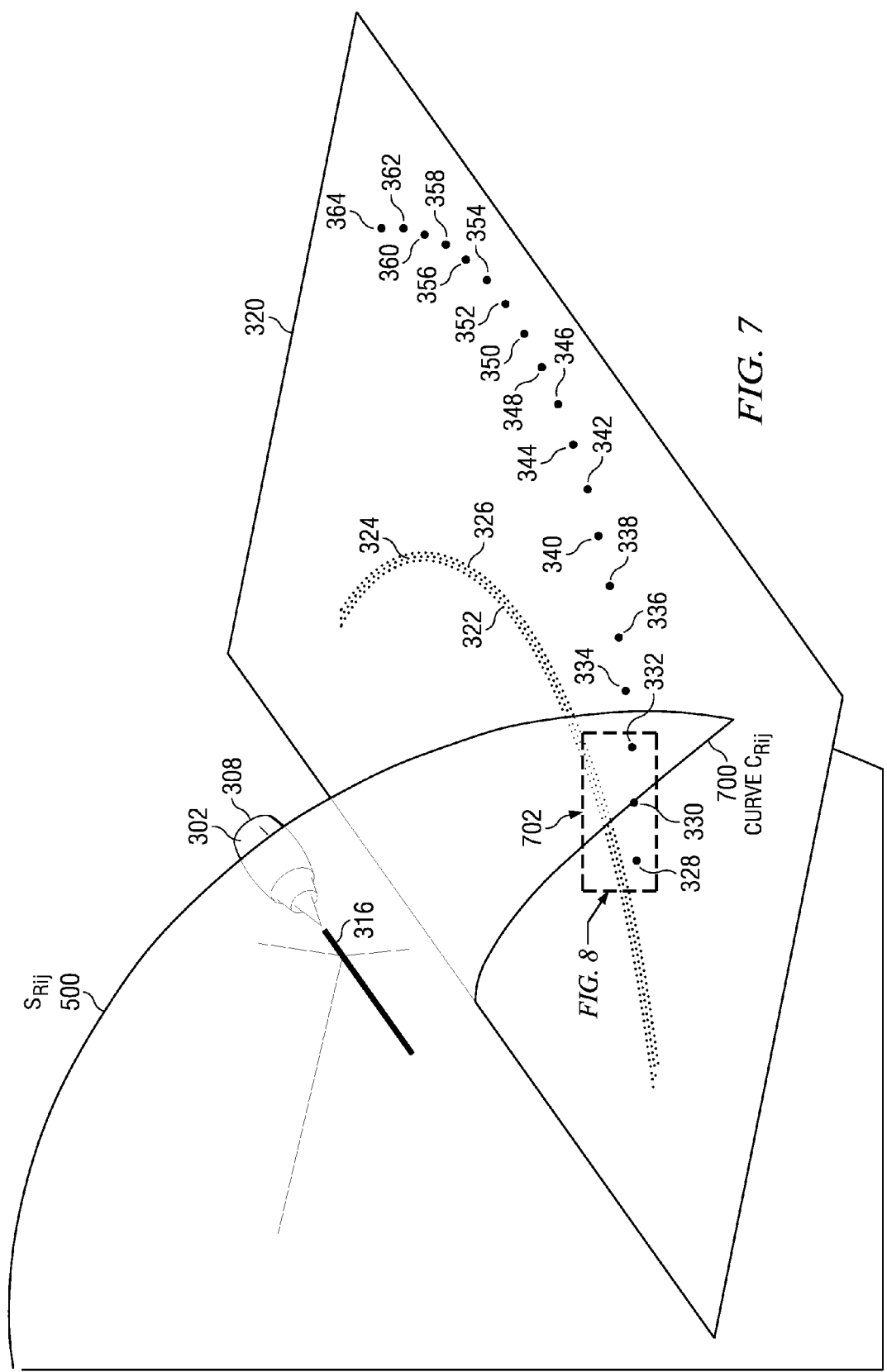
FIG. 7 is an intersection of a surface with a ground plane in accordance with an advantageous embodiment.

With reference now to FIG. 7, an intersection of a surface with a ground plane is depicted in accordance with an advantageous embodiment. In this example, the intersection of surface 500 with ground plane 320 is depicted in accordance with an advantageous embodiment. The intersection of surface 500 with ground plane 320 forms curve 700. Curve 700 is also referred to as curve $C_{Rij}$. Curve 700 may be used to identify a microphone within phased array microphones 318. This microphone may be located within section 702 in these examples.

Figure 8:
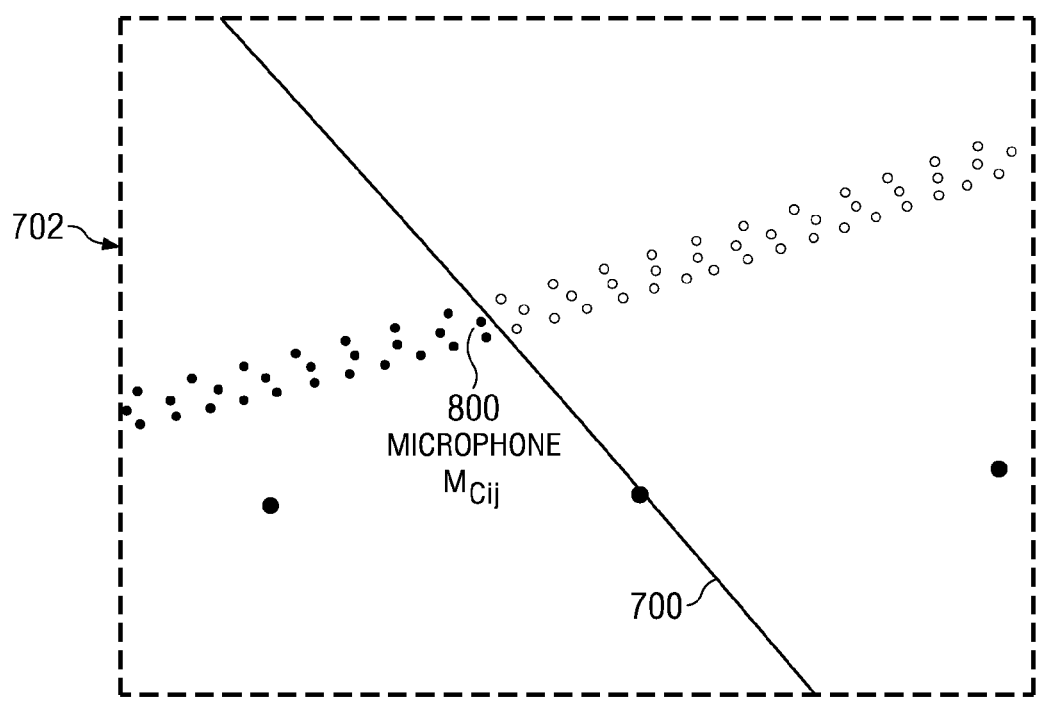
FIG. 8 is a more detailed illustration of a curve formed from an intersection of a surface with a ground plane in accordance with an advantageous embodiment.

In FIG. 8, a more detailed illustration of a curve formed from an intersection of a surface with a ground plane is depicted in accordance with an advantageous embodiment. In this example, curve 700 is closest to microphone 800 in section 702 within phased array microphones 318. This microphone is also referred to as microphone $M_{Cij}$. Microphone 800 is the element within phased array microphones 318 that is closest to curve 700. This microphone is considered the center array element for a subarray that is to be defined or selected from phased array microphones 318.

In addition, for each frequency of interest $f_k$, an array aperture solid angle $\Omega_{fk}$ may be identified. This array aperture solid angle may be selected based on various factors. These factors include, for example, directivity characteristics, source resolution requirements, and other suitable factors. This angle is used to identify additional curves, which are bounding curves. These bounding curves are used to define or select the subarray from phased array microphones 318.

Figure 9:
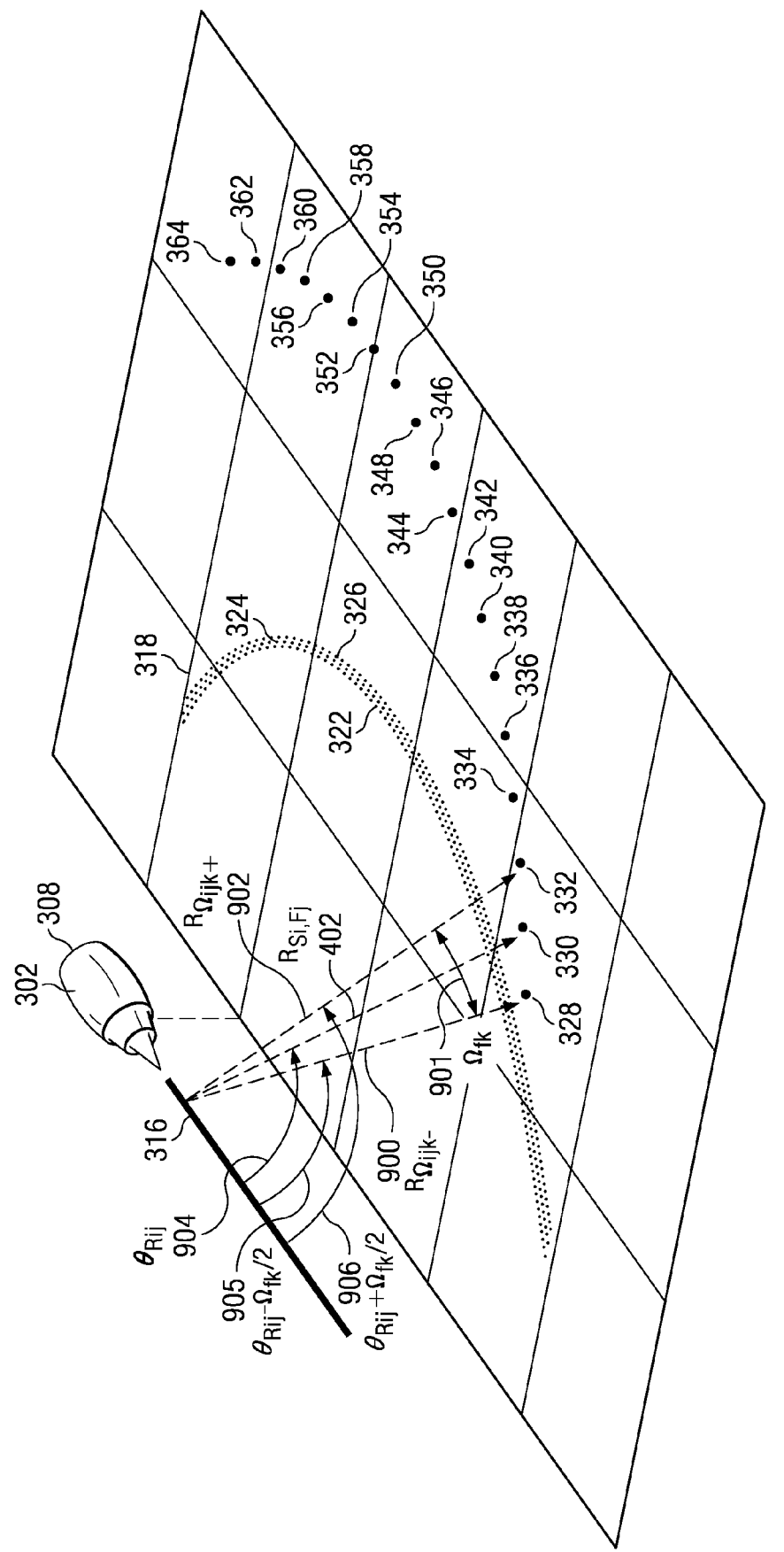
FIG. 9 is a diagram illustrating angles used in defining a subarray in accordance with an advantageous embodiment.

With reference now to FIG. 9, a diagram illustrating angles used in defining a subarray is depicted in accordance with an advantageous embodiment. In this example, angle 904 is also referred to as $\theta_{Rij}$. This angle is the angle between jet engine axis 316 and ray trace 402. Array aperture angle $\Omega_{fk}$ 901 may be used to select ray traces 900 and 902 in these examples. Ray trace 900 may also be referred to as ray trace $R_{\Omega ijk-}$ and ray trace 902 may also be referred to as ray trace $R_{\Omega ijk+}$.

Angle 905 for ray trace 900 is referred to as $\theta_{Rij}-\Omega_{fk}/2$. Ray trace 902 has angle 906 that is referred to as $\theta_{Rij}+\Omega_{fk}/2$. Ray trace 900 and ray trace 902 may be rotated about jet engine axis 316 to generate surfaces. Ray trace 900 and ray trace 902 are also referred to as bounding ray traces. This terminology is used because these ray traces form a bound used to define or select a subarray from phased array microphones 318.

Figure 10:
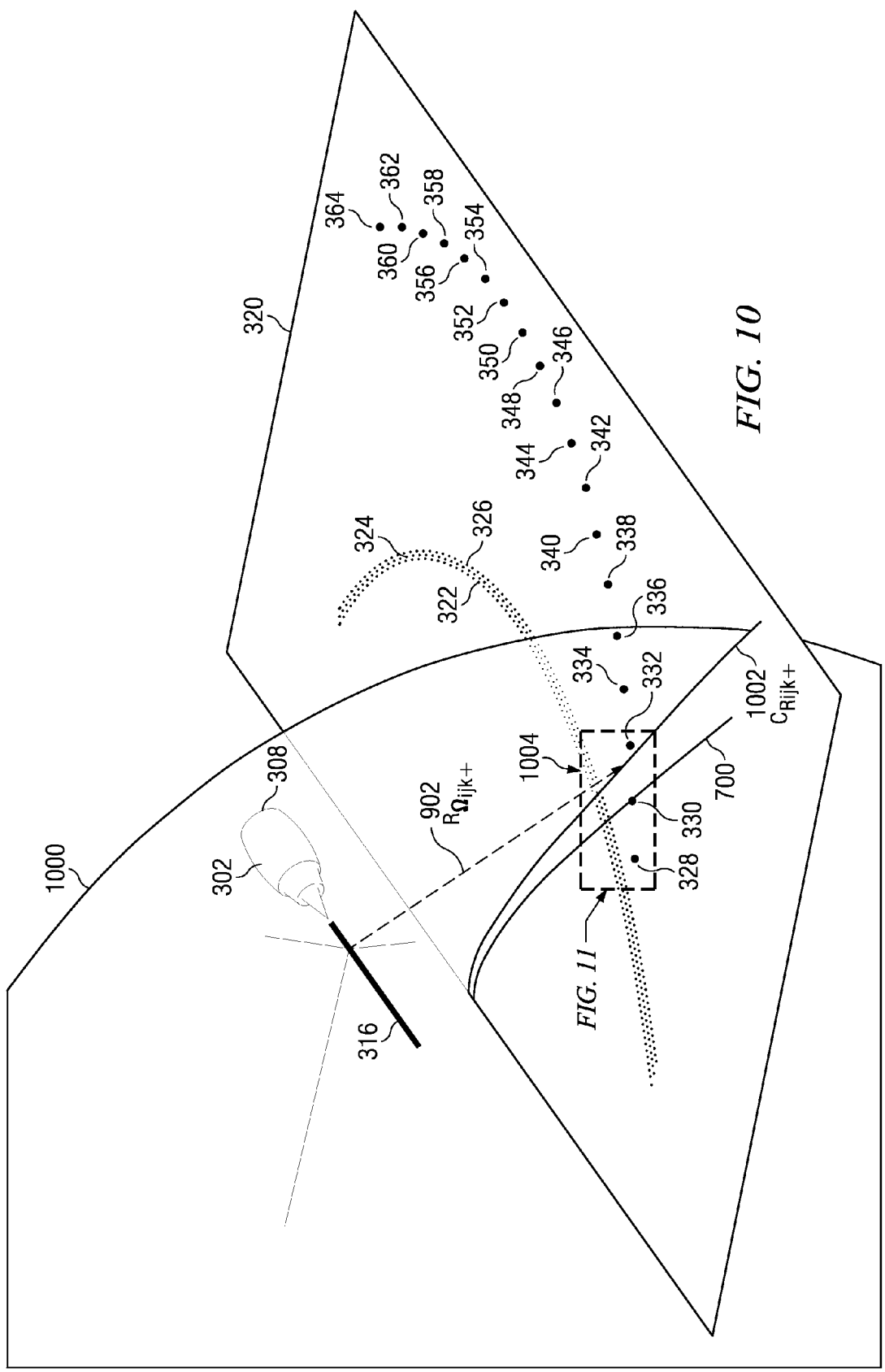
FIG. 10 is a diagram illustrating a surface generated by rotating a ray in accordance with an advantageous embodiment.

With reference now to FIG. 10, a diagram illustrating a surface generated by rotating a ray is depicted in accordance with an advantageous embodiment. In this example, surface 1000 is generated by rotating ray trace 902 around jet engine axis 316. Surface 1000 is also referred to as a bounding surface. The intersection of surface 1000 with ground plane 320 forms curve 1002, which is also referred to as curve $C_{Rijk+}$. Curve 1002 may be used to identify a microphone on one end of the subarray within region 1004.

Figure 11:
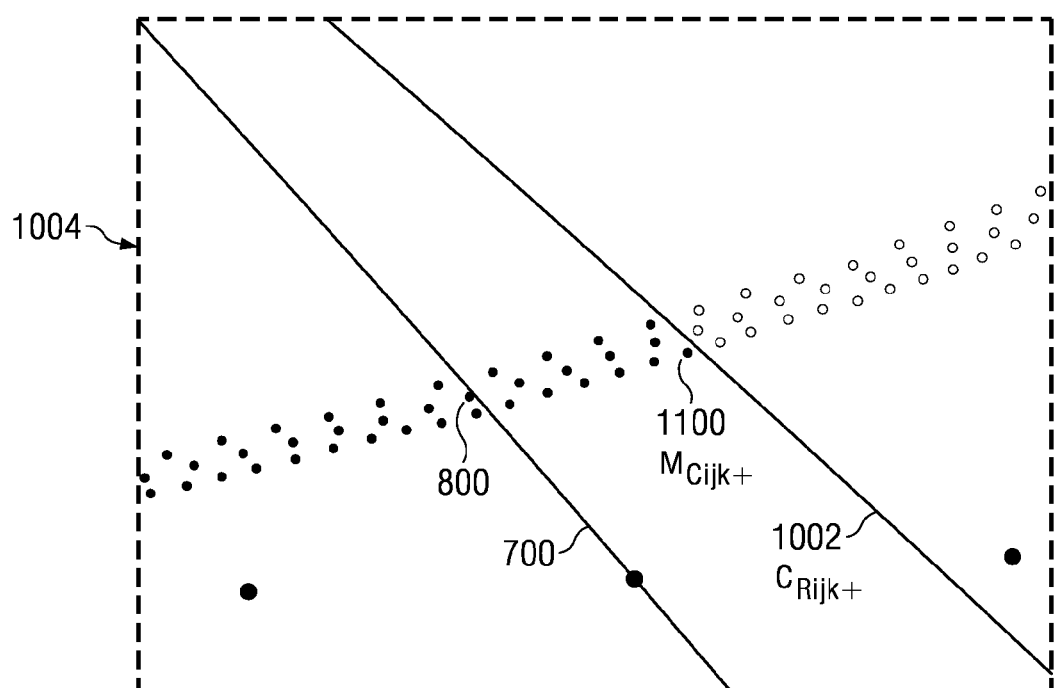
FIG. 11 is a more detailed illustration of a microphone at one end of a subarray in accordance with an advantageous embodiment.

With reference now to FIG. 11, a more detailed illustration of a microphone at one end of a subarray is depicted in accordance with an advantageous embodiment. In this example, microphone 1100 is a microphone within phased array microphones 318 closest to curve 1002. Microphone 1100 is also referred to as microphone $M_{Cijk+}$. This microphone defines one end of the subarray.

Figure 12:
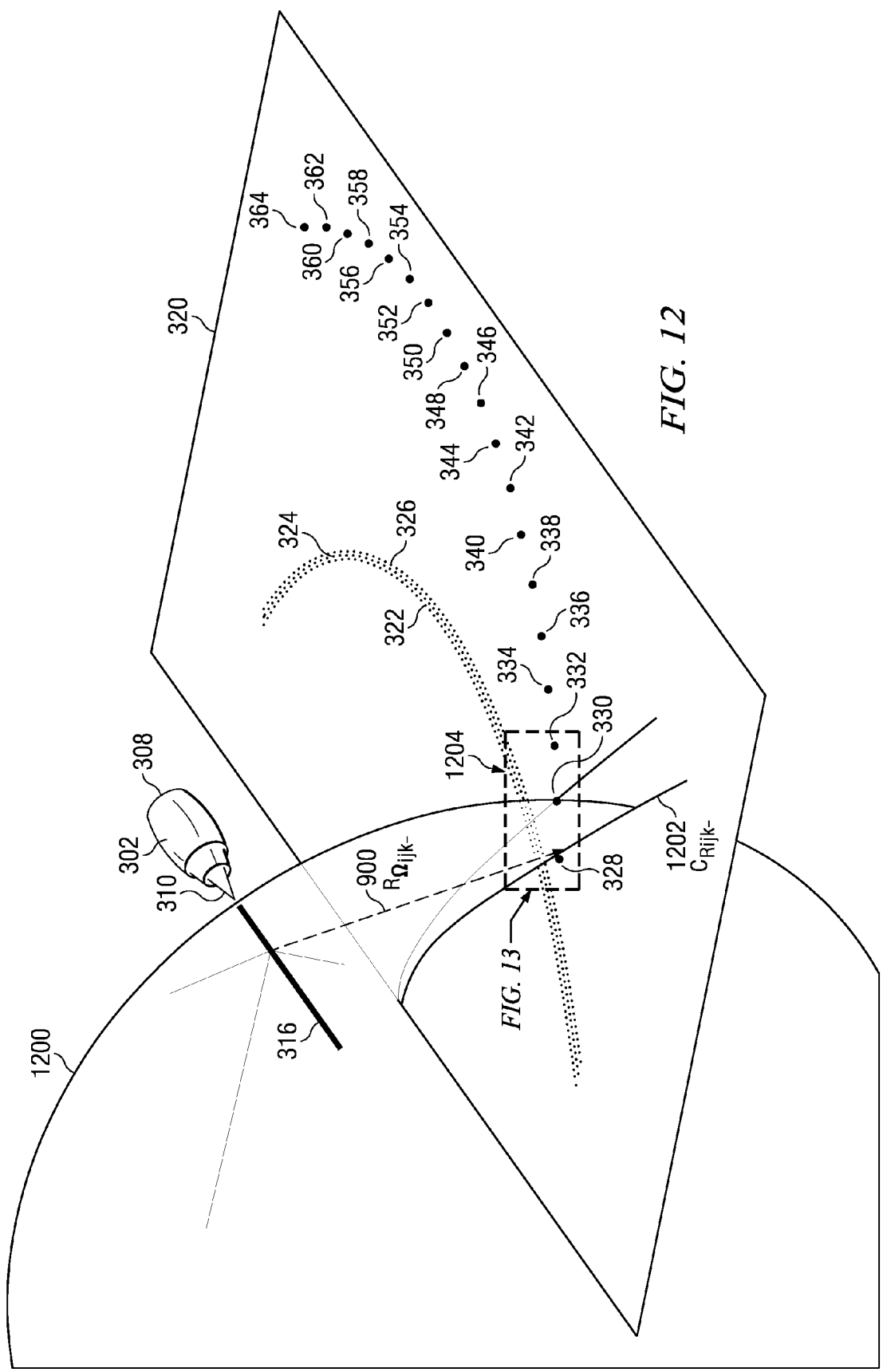
FIG. 12 is a diagram illustrating an intersection of a surface with a ground plane in accordance with an advantageous embodiment.

With reference now to FIG. 12, a diagram illustrating an intersection of a surface with a ground plane is depicted in accordance with an advantageous embodiment. In this example, surface 1200 is formed by rotating ray trace 900 around jet engine axis 316. Surface 1200 is also referred to as a bounding surface. The intersection of surface 1200 with ground plane 320 forms curve 1202, which is also referred to as curve $C_{Rijk-}$. From this intersection, a microphone for another end of the subarray may be identified within region 1204.

Figure 13:
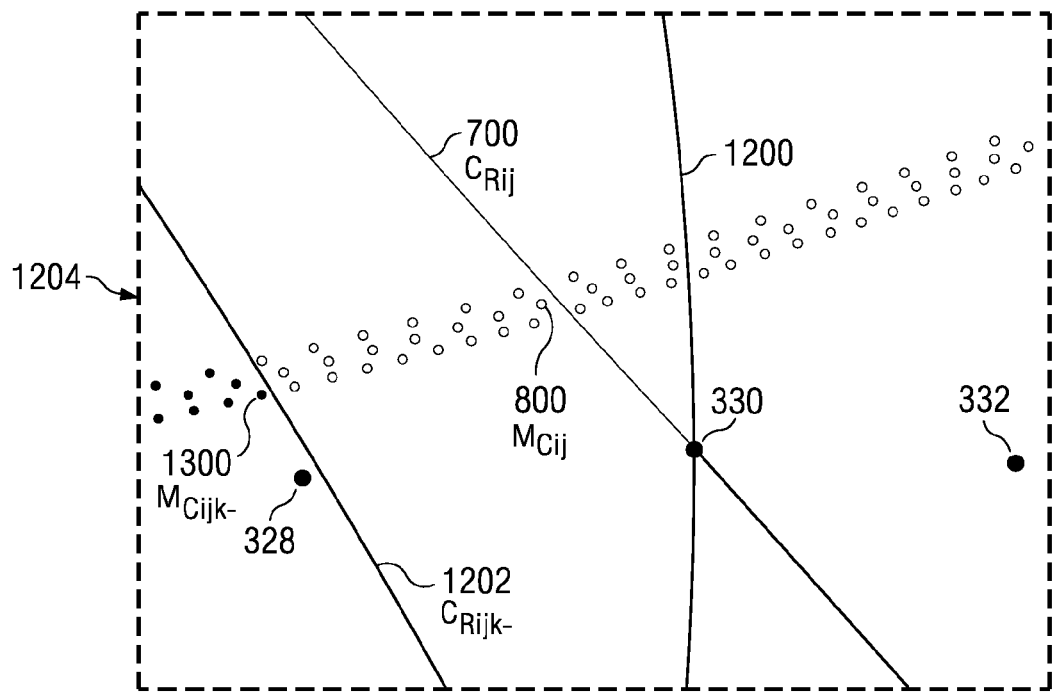
FIG. 13 is a more detailed illustration of a microphone located at one end of a subarray in accordance with an advantageous embodiment.

With reference now to FIG. 13, a more detailed illustration of a microphone located at one end of a subarray is depicted in accordance with an advantageous embodiment. In this example, microphone 1300 is a microphone closest to curve 1202 in region 1204. Microphone 1300 is also referred to as microphone $M_{Cijk-}$. This microphone defines the other end of the subarray within phased array microphones 318.

Figure 14:
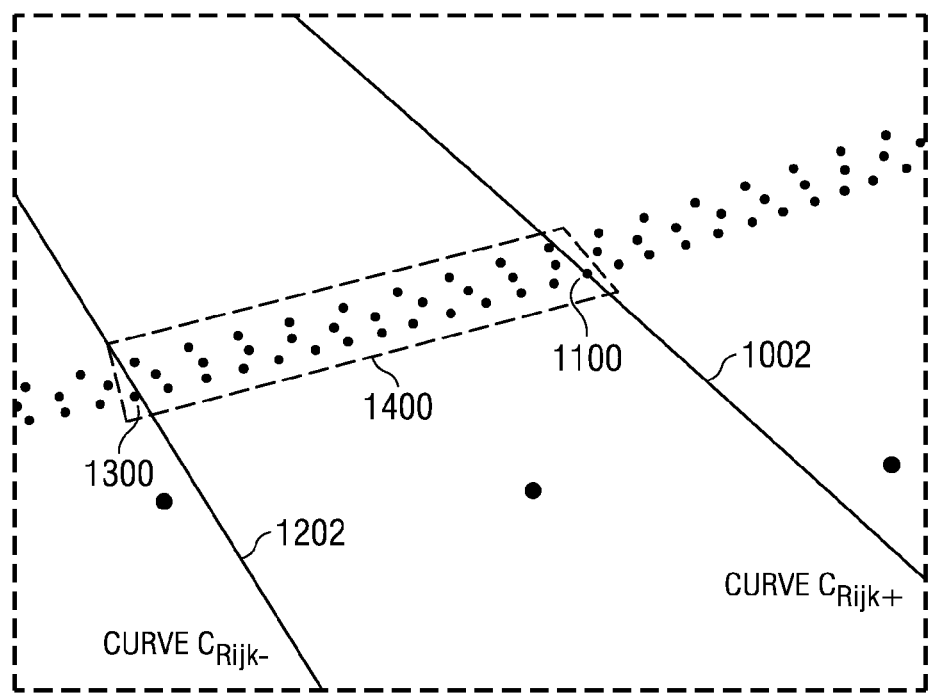
FIG. 14 is a diagram illustrating a subarray in accordance with an advantageous embodiment.

With reference now to FIG. 14, a diagram illustrating a subarray is depicted in accordance with an advantageous embodiment. In this example, subarray 1400 contains microphones located between and including the microphone 1100 closest to curve 1002 and between and including the microphone 1300 closest to curve 1202. As a result, the different microphones located between and/or near these two curves are selected for the subarray, in this example.

In these examples, each selection of a subset of a given aperture size from any location along the array, such as subarray 1400, may have approximately a same number of sound sensors and will perform similarly when used for noise source location. The aperture size in this example may be the extent or length of the subarray.

A longer sub array has a larger aperture and has more microphones. A shorter subarray has a smaller aperture and a smaller number of microphones. Having approximately the same number of elements in these examples means that if a subarray of a given aperture size is selected from anywhere along the array, a subarray is obtained that has approximately the same number of sensors as any other subarray with that same aperture size.

Approximately, as used in this specific example may be, for example, plus or minus five percent as one illustrative example. Performing similarly, in this example, means that the source resolution and dynamic range capabilities of the subarray will be approximately the same. Source resolution in the different examples refers to the ability to resolve closely spaced sources. Array dynamic range refers to the subarray's ability to resolve sources of varying amplitudes. The greater variation in amplitudes that a subarray can discern, the greater its dynamic range.

In this manner, the different operations performed in FIGS. 4-13 may be used to select microphones for inclusion within subarray 1400. The selection of these microphones may provide sufficient data for analyzing noise traveling in a sound path from the candidate noise source location of interest to the measurement point of interest. This type of process may be performed for each of the far field microphones, for each candidate source location, and for each frequency. This process then may result in many hundreds or thousands of unique subarrays that may be used to process noise data and determine component noise contributions from a device under test to several measurement points of interest.

In the different advantageous embodiments, the different steps illustrated for identifying a subarray are performed for each microphone of interest located at the measurement points of interest in the set of far field microphones for each candidate sound source point of interest in a set of candidate sound source points for all frequencies of interest. By selecting multiple subarrays for different far field microphones, a comprehensive source component breakdown may be performed to identify different components contributing to the sound generated by the device under test.

Figure 15:
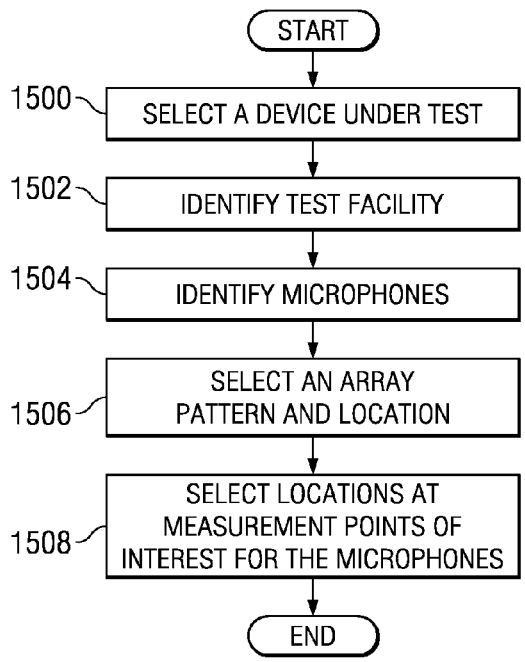
FIG. 15 is a flowchart of a process for configuring a noise collection apparatus in accordance with an advantageous embodiment.

With reference now to FIG. 15, a flowchart of a process for configuring a noise collection apparatus is depicted in accordance with an advantageous embodiment. In this example, the operations performed in FIG. 15 may be used to generate a configuration for a noise collection apparatus, such as noise collection apparatus 100 in FIG. 1.

The process begins by selecting a device under test (operation 1500). Thereafter, the process identifies the test facility (operation 1502). The process also identifies microphones that are available for use (operation 1504). The microphones identified for use in operation 1504 may include microphones for the array, as well as microphones for the measurement points of interest. The identification microphones may include numbers of microphones and/or types of microphones that may be used.

The process then selects an array pattern and location for the array (operation 1506). The process selects locations for the microphones used at the measurement points of interest (operation 1508), with the processing terminating thereafter. The selection of the pattern and locations for the different microphones may be based on factors such as the test facility, the microphones used, the device under test, and other suitable factors.

The different operations illustrated in FIG. 15 may be performed in different orders, depending on the particular implementation. Further, other operations may be used in addition to or in place of the ones illustrated. For example, the process in FIG. 15 also may include a location for the device under test. Of course, in some advantageous embodiments, the location for the device under test may be based on the test facility being used. Also, in other advantageous embodiments, the point of interest microphones may be preset based on the test facility.

Figure 16:
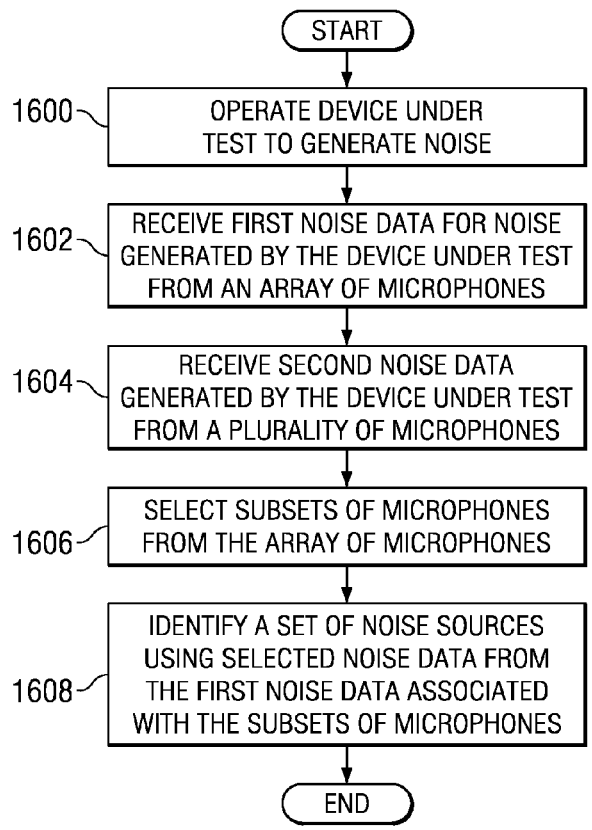
FIG. 16 is a high level flowchart of a process for identifying noise source components from a device under test in accordance with an advantageous embodiment.

With reference now to FIG. 16, a high level flowchart of a process for identifying components in devices under test is depicted in accordance with an advantageous embodiment. The process illustrated in FIG. 16 may be implemented using a noise collection apparatus, such as noise collection apparatus 100 in FIG. 1. In particular, the process illustrated in FIG. 16 may be implemented in data acquisition system 106 and/or computer 110.

The process begins by operating the device under test to cause the generation of noise (operation 1600). Thereafter, first noise data is received, for the noise generated by the device under test, by an array of microphones (operation 1602). The process receives second noise data generated by the device under test from a plurality of microphones (operation 1604). In these examples, the plurality of microphones is a plurality of microphones located at measurement points of interest.

The process selects subsets of microphones from the array of microphones (operation 1606). Operation 1606 is used to select smaller portions or subarrays within the array of microphones. The process then identifies a set of noise sources using selected noise data from the first noise data associated with the subsets of microphones (operation 1608), with the process terminating thereafter.

Figure 17:
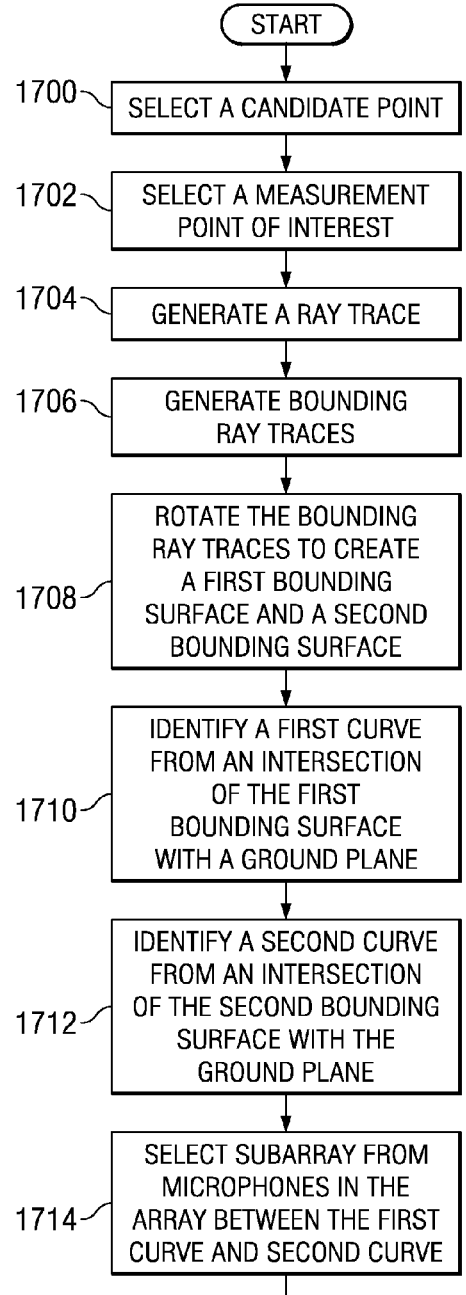
FIG. 17 is a flowchart of a process for selecting a subset of microphones in accordance with an advantageous embodiment.

With reference now to FIG. 17, a flowchart of a process for selecting a subset of microphones is depicted in accordance with an advantageous embodiment. The process illustrated in FIG. 17 is a more detailed illustration for selecting one of the plurality of selected subsets of operation 1606 in FIG. 16.

The process begins by selecting a candidate noise source location (operation 1700). This candidate noise source point may be along an axis defined for the device under test. For example, the source point may be on the device under test itself or on an axis defined from the device under test. The process then selects a measurement point of interest (operation 1702). This measurement point of interest may take the form of a far field microphone, such as far field microphone 320 in FIG. 3.

The process then generates a ray trace from the candidate noise source point to the measurement point of interest (operation 1704). This ray trace may define a noise path from the candidate noise source point to the measurement point. The process generates bounding ray traces (operation 1706). These bounding ray traces are generated based on the ray trace from the candidate noise source point to the measurement point. The bounding traces may be defined based on angles relative to the ray trace. These angles may be selected as array aperture solid angles, such that the bounding ray traces coincide with the sides of the array aperture solid angle.

The process may then rotate the bounding ray traces to create a first bounding surface and a second bounding surface (operation 1708). These bounding surfaces may be, for example, surface 1000 in FIG. 10 and surface 1200 in FIG. 12. From these bounding surfaces, a first curve may be identified from an intersection of the first bounding surface with a ground plane (operation 1710). This first curve may be, for example, curve 1002 in FIG. 10.

Next, a second curve is identified from an intersection of the second bounding surface with the ground plane (operation 1712). This second curve may be, for example, curve 1202 in FIG. 12. The process then selects the subarray from microphones in the array between the first curve and second curve (operation 1714), with the process terminating thereafter. Of course, in some advantageous embodiments, the microphones may fall just outside of the curve depending on the particular implementation.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of computer usable or readable program code, which comprises one or more executable instructions for implementing the specified function or functions.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

Thus, the different advantageous embodiments provide a computer implemented method, apparatus, and computer usable program code for processing sound data. In the different advantageous embodiments, first noise data may be received from an array of sound sensors in which the noise data is for noise detected from a device under test. The process also receives second noise data from a set of sound sensors in which the second noise data is for the noise detected from the device under test.

Subsets of the sound sensors in the array of sound sensors may be identified. A first portion of the first noise data associated with the subsets of sound sensors and a second portion of the second noise data for a sound sensor located at a measurement point of interest may be selected. In this manner, this data may be used to identify components within a noise source region due to operation of a device under test that generates noise found in the noise data.

Thus, a more comprehensive analysis of noise may be made because many more angles and points may be identified and analyzed using the array configuration and subarray selection methodology in the different advantageous embodiments, as compared to currently used mechanisms. With this information, actual noise data may be compared more easily to analytical models of noise generation to determine whether a model for predicting noise is accurate. Further, the different advantageous embodiments also may be used to determine whether and to what extent changes to a device under test have changed the noise components that contribute to the noise generated by the device under test.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non-limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W) and DVD.

Further, a computer-usable or computer-readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Without limitation, modems and network adapters are just a few of the currently available types of communications adapters.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for identifying a component breakdown of noise from a noise source, the method comprising:
   receiving noise data for the noise source from an array of sound sensors on a ground plane;
   selecting a measurement point of interest;
   selecting a candidate sound source point located along an axis;
   identifying array aperture angle;
   identifying a first bounding ray trace and a second bounding ray trace from a ray trace extending from the candidate sound source point towards the measurement point of interest using the array aperture angle;

rotating the first bounding ray trace and the second bounding ray trace around the axis to form a first surface and a second surface;

identifying a first curve from an intersection of the first surface with the ground plane;

identifying a second curve from an intersection of the second surface with the ground plane; and selecting a set of sound sensors from the array of sound sensors using the first curve and the second curve to form a subarray; and identifying the component breakdown of the noise generated by the noise source using a portion of the noise data from sound sensors in the subarray.

2. The method of claim 1, wherein the noise data is first noise data and further comprising:

receiving second noise data for the noise source from the set of sound sensors located at the measurement points of interest; and identifying the component breakdown of the noise generated by the noise source using a portion of the second noise data associated with a sound sensor located at a measurement point in the measurement points of interest.

3. The method of claim 1, wherein the step of identifying the array aperture angle comprises:

selecting the array aperture angle for a selected frequency of interest.

4. The method of claim 1 further comprising:

generating the noise data by the array of sound sensors in response to the array of sound sensors detecting noise generated by the noise source.

5. The method of claim 1 further comprising:

selecting the noise source from one of a jet engine, a train, a car, a submarine, a section of a highway, and a building.

6. The method of claim 1, wherein the array of sound sensors and the set of sound sensors are selected from at least one of a microphone, a hydrophone, and a seismometer.

7. The method of claim 6, wherein the microphone is an omni-directional microphone.

8. A method for processing noise data, the method comprising:

receiving first noise data from an array of sound sensors, wherein the noise data is for noise detected from a noise source;

receiving second noise data from a set of sound sensors, wherein the second noise data for the noise detected is from the noise source;

identifying a subset of sound sensors in the array of sound sensors; and selecting a first portion of the first noise data associated with the subset of sound sensors and a second portion of the second noise data for a sound sensor located at a measurement point of interest.

9. The method of claim 8 further comprising:

identifying a set of components contributing to the noise from the noise source using the first portion of the first noise data associated with subsets of sound sensors and the second portion of the second noise data for sound sensors located at measurement points of interest.

10. The method of claim 8, wherein the identifying step comprises:

selecting the sound sensor from the set of sound sensors;

selecting a candidate sound source point for a sound source along an axis;

identifying a primary ray trace extending from the candidate sound source point towards the sound sensor;

identifying an angle for the primary ray trace relative to the axis;

identifying a first bounding ray trace and a second bounding ray trace from a ray trace extending from the sound source point towards the measurement point of interest, wherein the first bounding ray trace has a first angle greater than the angle and the second ray trace has a second angle less than the angle;

identifying a first curve formed at an intersection of a first surface with a ground plane, wherein the first surface is formed from a rotation of the first bounding ray trace around the axis;

identifying a second curve formed at an intersection of the second surface with the ground plane, wherein the second surface is formed from a rotation of the second bounding ray trace around the axis; and selecting the set of sound sensors from the array of sound sensors using the first curve and the second curve to form the subset of sound sensors.

11. The method of claim 10, wherein a difference between the first angle and the second angle forms an array aperture angle.

12. The method of claim 8 further comprising:

repeating the steps of receiving the first noise data, receiving the second noise data, identifying the subset of sound sensors, and selecting the first portion of the first noise data associated with the subset of microphones and the second portion of the second noise data for the sound sensor located at the measurement point of interest for each sound sensor of interest in the set of sound sensors for each candidate sound source point of interest for all frequencies of interest.

13. The method of claim 11 further comprising:

selecting the array aperture angle for a desired frequency.

14. The method of claim 9, wherein the step of identifying the set of components contributing to the noise from the noise source comprises:

identifying a set of amplitudes present in the first portion of the first noise data associated with the subset of microphones and the second portion of the second noise data for the sound sensor located at the measurement point of interest.

15. The method of claim 14, wherein the set of amplitudes is for a set of frequencies.

16. The method of claim 8 further comprising:

selecting the noise source from one of a jet engine, a train, a car, a submarine, a section of a highway, and a building.

17. The method of claim 8, wherein the array of sound sensors and the set of sound sensors are selected from at least one of a microphone, a hydrophone, and a seismometer.

18. The method of claim 8, wherein each selection of the subset of a given aperture size from any location along the array will have approximately a same number of sound sensors and will perform similarly when used for determining noise source location.

19. The method of claim 18, wherein the subarray has an aperture size that is based on a frequency.

20. An apparatus comprising:

an array of sound sensors;

a set of sound sensors located at a set of measurement points of interest;

a data acquisition system coupled to the array of sound sensors and the set of sound sensors, wherein the data acquisition system is capable of receiving first noise data from the array of sound sensors and receiving second noise data from the set of sound sensors; and a data processing system capable of identifying a primary ray trace extending from a sound source point towards a sound sensor; identifying an angle for the primary ray trace relative to the axis; identifying a first bounding ray trace and a second bounding ray trace from a ray trace extending from a source point towards the measurement point of interest, wherein the first bounding ray trace has a first angle greater than the angle and the second ray trace has a second angle less than the angle; identifying a first curve from an intersection of a first surface, created from a rotation of the first bounding ray trace around the axis, with a ground plane; identifying a second curve from an intersection of a second surface, created from a rotation of the first bounding ray trace around the axis, with the ground plane; and selecting the set of sound sensors from the array of sound sensors using the first curve and the second curve to identify the subset of sound sensors.

21. The apparatus of claim 20 further comprising:
a storage device, wherein the first noise data and the second noise data are stored in the storage device.

22. An apparatus comprising:
an array of sound sensors, wherein the array has a relatively consistent density of sensors over all while having non-redundant sensor-to-sensor spacing locally;
a set of sound sensors located at a set of measurement points of interest; and
a data acquisition system coupled to the array of sound sensors and the set of sound sensors, wherein the data acquisition system is capable of receiving first noise data from the array of sound sensors and receiving second noise data from the set of sound sensors.

23. The apparatus of claim 22, wherein the spacing between adjacent sound sensors in the array exceeds the half wavelength criteria for equally spaced sound sensors, wherein false images are avoided when performing noise source location operations.

24. The apparatus of claim 23, wherein all sounds sensors in the array of sound sensors are placed at least a selected distance away from a candidate noise source region for a device under test.

25. The apparatus of claim 24, wherein the device under test is a jet engine and wherein selected distance is at ten mixed nozzle diameters.

26. The apparatus of claim 25, wherein the array of sensors comprises a set of concentric logarithmic spirals.

27. The apparatus of claim 25, wherein the array of sensors comprises a set of concentric curves for which a shape of the set of curves is selected by a minimum distance of the array of sensors to the candidate source region and wherein a nearest curve in the set of curves is located at the minimum distance.

28. The apparatus of claim 26, wherein a unique base spacing between sensors is used to determine the sensor locations along each logarithmic spiral.

29. The apparatus of claim 28, wherein actual spacing varies from the base spacing along each concentric logarithmic spiral in the set of concentric logarithmic spirals according to a repeating sequence of delta spacings such that the array of sound sensors is locally non-redundant.

30. The apparatus of claim 29, wherein combined base spacings and a sequence of delta spacings prevents duplicate spacings within the set of concentric logarithmic spirals except within any given concentric logarithmic spiral once the sequence of delta spacings repeats.

31. The apparatus of claim 29, wherein the sequence of delta spacings is different in each repeated sequence in the repeating sequence of delta spacings, wherein a repeated spacing is avoided.

32. The apparatus of claim 29, wherein the array of sensors has a shape of a continuous curve for which a tangent to the continuous curve is kept substantially close to perpendicular from lines of sight to the candidate noise source locations to be assessed using the array sensor array.

33. The apparatus of claim 22, wherein the array of sensors is located substantially perpendicular to and is intersected by lines of sight from the potential noise source region of interest to measurement points of interest.

* * * * *